3,195,979
PROCESS OF PREPARING HYDROGEN FLUO-
RIDE FROM FLUOSILICIC ACID
George M. Burkert and Arthur N. Baumann, Lakeland,
Fla., assignors to International Minerals & Chemical
Corporation, a corporation of New York
Filed Dec. 18, 1961, Ser. No. 160,202
10 Claims. (Cl. 23—153)

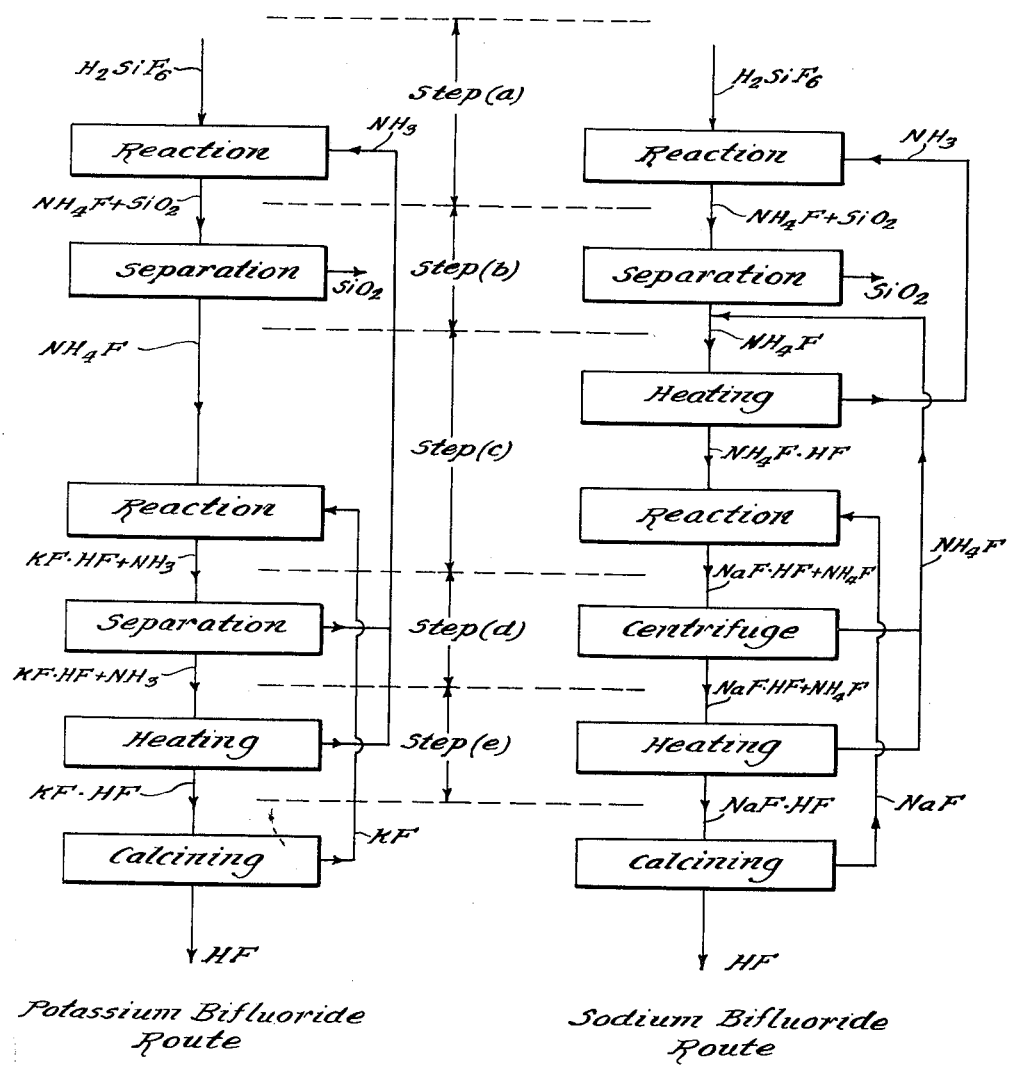

This is a continuation-in-part application of application Serial No. 861,782, filed December 24, 1959, now abandoned.

The present invention generally relates to a process for the production of fluorine compounds from fluosilicic acid. More particularly it relates to a process for preparing hydrogen fluoride from fluosilicic acid.

Fluosilicic acid is a commercially available material of relatively low cost. Large amounts of fluosilicic acid are produced as a by-product of the fertilizer industry.

Some fluosilicic acid is used in the production of aluminum fluoride and synthetic cryolite and because of its ready availability and relatively low cost, new uses for the acid are being investigated. The process of the present invention provides a novel process for producing hydrogen fluoride from fluosilicic acid. Large quantities of hydrogen fluoride or hydrofluoric acid (HF) are used in the production of aluminum fluoride, cryolite and other metal fluorides. The process of this invention may, when desired, also be used to prepare potassium bifluoride and sodium bifluoride from fluosilicic acid.

It is an object of the present invention to provide a new and novel process for the production of fluoride compounds from fluosilicic acid.

It is another object of the invention to provide a process for preparing hydrogen fluoride from fluosilicic acid.

It is a further object of the present invention to provide an integrated and autogenous process for preparing hydrogen fluoride from fluosilicic acid which includes the step of reacting a fluoride of ammonia with an alkali metal fluoride to prepare an alkali metal bifluoride.

These and other objects and advantages of the present invention will be apparent from the detailed description of the invention.

Generally described, the present invention is a process for preparing hydrogen fluoride from fluosilicic acid which comprises the following steps:

(a) Reacting fluosilicic acid with ammonia to form ammonium fluoride and silica, (b) Separating said silica from said ammonium fluoride, (c) Introducing said separated ammonium fluoride and an alkali metal fluoride into a treating zone wherein said ammonium fluoride and said alkali metal fluoride are subjected to treating conditions to react a fluoride of ammonia with said alkali metal fluoride to form an alkali metal bifluoride, (d) Separating said alkali metal bifluoride from the mixture resulting from step (c), (e) Heating said separated alkali metal bifluoride to a temperature at least sufficiently high to produce an alkali metal bifluoride substantially free of ammonia and ammonium fluoride and below that at which substantial decomposition of said alkali metal bifluoride is effected, (f) Heating the alkali metal bifluoride substantially free of ammonia and ammonium fluoride from step (e) to a temperature sufficiently high to decompose said alkali metal bifluoride to form hydrogen fluoride and alkali metal fluoride, (g) Separating said alkali metal fluoride and said hydrogen fluoride produced by the heating in step (f), (h) Recycling said alkali metal fluoride separated in step (g) to step (c), and (i) Recovering said hydrogen fluoride separated in step (g).

The instant process offers an economical and novel method of preparing hydrogen fluoride. An aqueous solution of fluosilicic acid is the primary raw material of the process and the primary products are silica and hydrogen fluoride, both of which have known commercial utility. The ammonia and alkali metal fluoride used in the process are recycled within the process and only make-up quantities, to take care of process losses, are necessary. The overall process, therefore, represents an integrated and interdependent series of process steps for producing hydrogen fluoride from fluosilicic acid. Whereas prior art processes for the production of hydrogen fluoride usually require a plurality of primary raw materials, the present process utilizes only fluosilicic acid as the primary raw material. The overall process could be schematically illustrated as a stream of fluosilicic acid entering a treatment zone and silica and hydrogen fluoride leaving the treatment zone.

The process of the present invention has two preferred embodiments which are illustrated in the accompanying drawing. The drawing is a schematic flow sheet illustrating both preferred embodiments. The so-called potassium bifluoride route is illustrated in the left half of the drawing and the so-called sodium bifluoride route is illustrated in the right half of the drawing. Various steps of the process as presented in the general description of the invention are also designated in the drawing in order to facilitate a complete understanding of the invention.

Step (a)

Step (a) of the process of this invention is generally the same for both preferred embodiments; specifically the potassium bifluoride route and the sodium bifluoride route.

In step (a) of the general description of the invention an aqueous solution of fluosilicic acid is reacted with ammonia to form an aqueous solution of ammonium fluoride and silica.

The reaction may be represented by the following equation:

$$H_2SiF_6 + 6NH_3 + 2H_2O \rightarrow 6NH_4F + SiO_2 \qquad (1)$$

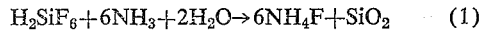

Any suitable aqueous solution of fluosilicic acid of suitable concentration may be used in the process of this invention. In the chemical treatment of fluorapatite or phosphate rock and during the evaporation of wet process phosphoric acid, a fluoride-containing gas is released, which is usually recovered as fluosilicic acid. This acid, which usually has a fluosilicic acid concentration between about 2% and about 30% by weight, may be used in the process of this invention. Industrial fluosilicic acid from other sources may also be used. It is preferred that from about 10% to about 30% by weight fluosilicic acid may be used.

Ammonia in any suitable form and concentration may be used in this invention. Gaseous ammonia, anhydrous ammonia, and aqueous solutions of ammonia or ammonium hydroxide may be used. Ammonia is used in an amount at least sufficient to react with substantially all of the fluosilicic acid to form an aqueous solution of ammonium fluoride and silicia. Ammonia is preferably used in stoichiometric excess of 105% of the theoretical and more preferably within the range of from about 105% to about 140% of the stoichiometric amount. This excess amount of ammonia raises the pH of the resultant solution to above 7.0 and preferably within the range of from about 8.5 to about 9.0. Vigorous agitation is preferred when admixing the ammonia and the fluosilicic acid. At a pH of about 8, the reaction is substantially complete and the resultant aqueous solution contains ammonium fluoride and a silica precipitate. In a preferred embodiment of the invention the major portion and more preferably substantially all of the ammonia for step (a) is produced in subsequent steps of this process and recycled to step (a).

The reaction between fluosilicic acid and ammonia to form silica and ammonium fluoride takes place at ambient temperatures although, when desired, higher or lower temperatures may be used. Temperatures within the range of from about 30° F. to about 170° F. are suitable.

*Step (b)*

Step (b) of the process of this invention is generally the same for both preferred embodiments.

The solution resulting from step (a) is an aqueous solution of ammonium fluoride containing precipitated silica. The silica is separated from the aqueous solution of ammonium fluoride in any suitable manner. Filtration, decantation, centrifugal separation, inter alia, are suitable means. The silica may be discarded but it generally has desirable physical properties and is recovered as a product of the process.

*Step (c)*

In step (c) of the process of this invention, the ammonium fluoride separated in step (b) and an alkali metal fluoride are introduced into a treating zone and are subjected to treating conditions to react a fluoride of ammonia with the alkali metal fluoride to form an alkali metal bifluoride from said alkali metal fluoride.

The ammonium fluoride separated in step (b), which is substantially free of silica, may be reacted directly with an alkali metal fluoride provided in an amount to react with substantially all of the separated ammonium fluoride to form ammonia and an alkali metal bifluoride.

Of the alkali metal fluorides sodium fluoride and potassium fluoride are specifically preferred. Other alkali fluorides such as lithium fluoride may be used. Potassium fluoride and sodium fluoride are specifically preferred, not only because of their commercial availability and relatively low cost, but also because their decomposition temperatures, solubilities, and kinetics in the process under consideration are such that they make the overall process commercially attractive since it is then operable on a continuous cyclic basis or autogenous basis. That is, when potassium fluoride and sodium fluoride are used in the process of this invention, a sufficient amount of the alkali metal fluoride is usually produced in subsequent steps of the process to supply substantially all of the alkali metal fluoride needed in step (c) and it is only necessary to add make-up amounts of alkali metal fluoride into the system to take care of usual process losses. The alkali metal fluoride is, accordingly, an intermediate material which is consumed and produced in the overall process. In a specifically preferred embodiment of the invention, the alkali metal fluoride utilized in step (c) of the process is essentially only the alkali metal fluoride produced in subsequently described step (f) and recycled in the process.

The alkali metal fluoride may be added as a dry powder or an aqueous slurry of suitable concentration may be used. The reaction of ammonium fluoride with the alkali metal fluoride takes place in aqueous solution at ambient temperature although higher or lower temperatures may be used when desired. Temperatures within the range of from about 50° F. to about 410° F. are contemplated for this step of the process, the temperature preferably within the range of from about 90° F. to about 300° F. The temperature should, of course, be maintained below the decomposition temperature of the reactants or the alkali metal bifluoride.

While sodium fluoride may be reacted directly with ammonium fluoride to form sodium bifluoride and ammonia, investigations have shown that only a 13% bifluoride yield can be expected at reaction temperatures within the range of from about 194° F. to about 248° F.

Accordingly, a modified, more efficient route using sodium fluoride was developed and step (c) of the process for the sodium bifluoride route is preferably as follows:

*Step (c) sodium bifluoride route*

The ammonium fluoride separated in step (b) is preferably heated to form ammonium bifluoride according to the following equation:

$$2NH_4F \rightarrow NH_4 \cdot HF + NH_3 \qquad (2)$$

Ammonium fluoride is also produced in subsequently described step (d) and a small amount in subsequently described step (e) in the sodium bifluoride route of the process of this invention and ammonium fluoride from these sources (steps (d) and (e)) is preferably recycled to the heating stage of step (c), as is illustrated in the drawing so as to convert the ammonium fluoride to ammonium bifluoride.

The ammonium fluoride of suitable concentration, preferably as a dilute aqueous solution of about 19% concentration, is evaporated and heated to a temperature within the range of from about 250° F. to about 410° F. to convert the ammonium fluoride to an ammonium bifluoride melt. The temperature range is preferably from about 300° F. to about 400° F. since higher yields of the bifluoride are obtained at temperatures within this preferred range.

The reaction according to Equation 2 also produces ammonia which is preferably recycled to step (a). In the preferred embodiment of this invention sufficient ammonia is produced by the reaction to provide substantially all of the ammonia necessary for step (a) of the process.

The fluoride of ammonia, specifically ammonium bifluoride ($NH_4F \cdot HF$) produced from the ammonium fluoride ($NH_4F$) is cooled in the treatment zone and reacted in aqueous solution with sodium fluoride (NaF) at a temperature within the range of from about 50° F. to about 170° F. and preferably within the range of from about 90° F. to about 150° F. At temperatures within these ranges the ammonium bifluoride and sodium fluoride react according to the following equation:

$$NH_4F \cdot HF + NaF \rightarrow NaF \cdot HF + NH_4F \qquad (3)$$

It has been determined that at temperatures below 170° F. the NaF·HF is less soluble in water than NaF. Accordingly, at temperatures utilized in this reaction, the NaF·HF precipitates. At temperatures above about 194° F. the solubility relationship is reversed with NaF·HF being more soluble than NaF and the reaction will not proceed. Accordingly, in the sodium bifluoride route a maximum temperature of about 170° F. should be maintained during the reaction.

The NaF may be introduced into the treating zone in any suitable form, preferably as a dry solid or as an aqueous slurry. When introduced as a solid either dry or as a slurry it is preferred that the sodium fluoride be of relatively small particle size, preferably substantially all −70 mesh size and more preferably substantially all of −100 mesh size. Results indicate that a 10% increase in conversion is obtained when using −100 mesh NaF as compared to using +70 mesh NaF.

*Step (d) sodium bifluoride route*

The product from step (c) of the sodium bifluoride route of the process of this invention is an *aqueous solution* of ammonium bifluoride and ammonium fluoride containing *crystals of* sodium bifluoride (NaF·HF) and also some ammonia.

In step (d) of the process, the sodium bifluoride is separated from the mixture resulting from step (c). Since the sodium bifluoride is in the solid phase as a precipitate it may be separated by, inter alia, decantation, filtration, centrifugation, etc. or any other method suitable for separating a solid from a liquid. The ammonium fluoride-containing mother liquor is preferably recycled to the heating stage of step (c) of the process as hereinbefore set forth. Some ammonia is also present and this is also preferably recycled with the ammonium fluoride.

*Step (e) sodium bifluoride route*

The wet sodium bifluoride solid (NaF·HF) separated in step (d) still contains some occluded mother liquor and ammonium fluoride and ammonia, the specific amount, of course, depending upon the particular conditions prevailing during the liquid-solid separation in step (d). The solid sodium bifluoride containing these impurities is, therefore, heated to a temperature high enough to dry the bifluoride and drive off or volatilize substantially all of the ammonium fluoride and ammonia but below that at which the sodium bifluoride decomposes to any appreciable degree to provide sodium bifluoride substantially free of ammonia and ammonium fluoride. Sodium bifluoride starts to decompose to a substantial degree at a temperature of about 575° F. and, therefore, the drying temperature should be below this and preferably is at a temperature within the range of from about 212° F. to about 550° F. and more preferably within the range of from about 225° F. to about 300° F.

The ammonium fluoride and the ammonia evolved in steps (d) and (e) of the sodium bifluoride route of the invention are recycled to the heating stage of step (c) of the process. Sufficient ammonium fluoride is evolved in steps (d) and (e) to provide the ammonium fluoride necessary in step (c). Accordingly, ammonium fluoride is also an intermediate within the overall process with ammonium fluoride being consumed in step (c) and evolved in steps (d) and (e). As hereinbefore set forth, a sufficient amount of ammonia is produced in the heating stage of step (c) to provide all the ammonia required for step (a). In a preferred embodiment of the invention, the ammonia utilized in step (a) of the process consists essentially of the ammonia produced in the heating stage of step (c) and recycled to step (a). The ammonium fluoride and ammonia streams may, of course, be subjected to purification steps before introduction into treatment zone (c) or reaction zone (a), respectively.

The heating of the ammonia-ammonium fluoride-alkali metal bifluoride mixture is an important aspect of this invention. When the alkali metal fluoride utilized in step (c) is selected from the group consisting of sodium fluoride and potassium fluoride, it is possible to heat the resulting ammonia-ammonium fluoride-alkali metal fluoride mixture from step (c) to a temperature sufficiently high to drive off substantially all of the ammonia and ammonium fluoride while still not decomposing the particular alkali metal bifluoride. In the present integrated process, therefore, substantially all of the ammonia and ammonium fluoride may be recovered and recycled within the process while still effecting a high recovery of the fluorine values in the fluosilicic acid starting material as product hydrogen fluoride.

Steps (f), (g), (h), and (i) are generally the same for the sodium bifluoride route of the process of this invention and for the potassium bifluoride route and are subsequently described.

*Step (c) potassium bifluoride route*

As hereinbefore set forth, in the general process of this invention, the ammonium fluoride from step (b) of the process is processed in a treating zone with an alkali metal fluoride. The specific process utilizing sodium fluoride has been described in detail and the specific process utilizing potassium fluoride is now described in detail in the following paragraphs.

In accordance with the potassium bifluoride route, the ammonium fluoride separated in step (b) is reacted directly with potassium fluoride. The potassium fluoride used is predominantly and preferably substantially all recycle material since a sufficient amount of potassium fluoride is usually produced in subsequently described step (f) to supply substantially all of the potassium fluoride needed in step (c) and it is generally only necessary to add make-up amounts into the system to take care of usual process losses.

The potassium fluoride and ammonium fluoride from step (b) are reacted in a reaction zone at a temperature preferably within the range of from 200° F. to about 410° F. and more preferably within the range of from about 220° F. to about 270° F. The reaction proceeds according to the following equation:

$$KF + NH_4F \rightarrow KF \cdot HF + NH_3 \qquad (4)$$

The ammonium fluoride is preferably introduced into the reaction zone as an aqueous solution of suitable concentration, preferably a concentrated solution. In the reaction zone evaporation of water is effected and ammonia gas is also evolved from the reaction mass. The potassium bifluoride (KF·HF) product of the reaction leaves the reaction zone as a melt.

The KF may be introduced into the treating zone as a substantially dry solid or as an aqueous slurry. When introduced as a solid either substantially dry or as a slurry, it is preferred that the potassium fluoride be of relatively small particle size, preferably substantially all of −70 mesh size particles and more preferably all of −100 mesh size particles.

*Step (d) Potassium bifluoride route*

The product from step (c) of the potassium bifluoride route of this invention is water vapor gaseous ammonia and a melt containing predominantly potassium bifluoride and also containing some water, ammonia and ammonium fluoride. The separation of the gas may be effected in any suitable manner. The ammonia-containing gas is preferably recycled to step (a) of the process. Some ammonium fluoride is also present in this gas and the gas stream may, of course, be purified before introduction into reaction zone (a).

*Step (e) potassium bifluoride route*

The separated potassium bifluoride melt contains some water, ammonia and ammonium fluoride and this is removed by heating the potassium bifluoride to dryness at a temperature of from about 220° F. to about 550° F. and preferably at a temperature within the range of from about 240° F. to about 300° F. At these temperatures the ammonia and ammonium fluoride are substantially entirely volatilized but the temperature is below that at which the potassium bifluoride decomposes to a substantial or appreciable degree.

Potassium bifluoride starts to decompose to a substantial degree at a temperature of about 600° F. and, therefore, the drying temerature should be below about 575° F. After the drying step the potassium bifluoride is substantially free of ammonia and ammonium fluoride.

The ammonia and ammonium fluoride evolved in steps (d) and (e) of the potassium bifluoride route of the invention is recycled to step (a) of the process. This ammonia stream may, of course, be purified before introduction into zone (a). Sufficient ammonia is evolved in steps (d) and (e) to provide the ammonia necessary in step (a). Accordingly, ammonia is also an intermediate within the overall process with ammonia being consumed in step (a) and evolved in steps (d) and (e). In a preferred embodiment of the invention, the ammonia utilized in step (a) is essentially only the ammonia produced in steps (d) and (e) and recycled to step (a).

*Step (f)*

As hereinbefore set forth, steps (f), (g), (h) and (i) are generally the same for the potassium bifluoride and sodium fluoride steps of the process. In this step, (f), the alkali metal bifluoride, substantially free of ammonia and ammonium fluoride is heated to decompose the alkali metal bifluoride to form hydrogen fluoride and alkali metal fluoride according to the following equations:

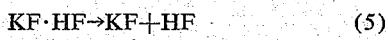  (5)

  (6)

The decomposition is at temperatures above that needed for drying and the heating may be called a calcining operation as illustrated in the drawing. The solid alkali metal fluoride is heated to a temperature above 575° F. and is generally below 1000° F., although higher temperatures may be used if desired but they are not generally necessary. The decomposition of the potassium bifluoride is preferably effected by calcining at a temperature within the range of from about 625° F. to about 700° F. The decomposition of the sodium bifluoride is preferably effected by calcining at a temperature within the range of from about 575° F. to about 650° F.

*Step (g)*

The hydrogen fluoride is produced as a substantially anhydrous gas and the alkali metal fluoride leaves the calcination zone as a solid. These materials are, therefore, readily separated from each other by any suitable means.

*Step (h)*

The separated alkali metal fluoride is recycled to step (c) of the respective process. As hereinbefore set forth the alkali metal fluoride is preferably used in finely divided form and accordingly, when necessary, the alkali metal fluoride is comminuted and screened to suitable mesh size, preferably so that the particles are substantially all of —70 mesh size and more preferably of —100 mesh size. In a preferred embodiment of this invention substantially all of the alkali metal fluoride used in step (c) is provided by the recycle material with only relatively small additions of additional alkali metal fluoride being made to take care of process losses.

*Step (i)*

The separated hydrogen fluoride gas from step (g) is substantially anhydrous and of high purity. The hydrogen fluoride in this gas stream may be directly recovered or may be subjected to further purification steps before obtaining the final hydrogen fluoride product. A suitable method for recovering the hydrogen fluoride comprises cooling the separated gas stream containing the hydrogen fluoride to a temperature below about 80° F. and preferably to below about 65° F. at which temperature the hydrogen fluoride condenses and is readily recovered as anhydrous liquid hydrogen fluoride.

In order to give a fuller understanding of the invention but with no intention to be limited thereto, the following specific examples are given.

EXAMPLE I

Fluosilicic acid of about 23% by weight concentration is reacted with a stoichiometric excess of concentrated ammonium hydroxide solution to produce an aqueous solution of ammonium fluoride containing silica. 125% of the theoretical amount of ammonia is used and the resultant solution has a pH of about 8.0 Vigorous agitation is used during this reaction and a temperature of about 80° F. is maintained.

The silica was filtered from the aqueous solution of ammonium fluoride.

The ammonium fluoride solution of about 19% by weight concentration, is introduced into a reaction zone wherein the ammonium fluoride is admixed with —70 mesh potassium fluoride. For each 113 parts by weight of fluoride introduced into the reaction zone 202 parts by weight of potassium as potassium fluoride is introduced into the reaction zone. Of the 202 parts by weight of potassium 195 parts by weight represents recycled material and 7 parts by weight represents make-up potassium to take care of process losses.

In the reaction zone the aqueous mixture of ammonium fluoride and potassium fluoride is subjected to evaporation and reaction at a temperature of about 245° F. The product of this reaction is a melt containing potassium bifluoride and gas containing water vapor and ammonia. The melt and the gas are separated from each other with the gas stream containing ammonia being recovered and recycled into contact with fresh fluosilicic acid.

The melt from the reaction zone is heated in a pug mill-dryer at a temperature of 257° F. The gas stream from the pug mill-dryer contains additional amounts of water and ammonia and some ammonium fluoride and is also recycled into contact with fresh fluosilicic acid feed. The solid material from the pug mill-dryer is high purity potassium bifluoride, substantially free of water, ammonia, and ammonium fluoride. This potassium bifluoride is then calcined at a temperature of 662° F. during which the potassium bifluoride decomposes to produce gaseous hydrogen fluoride and solid potassium fluoride. The solid potassium fluoride is recycled to the reaction zone and contacted with more ammonium fluoride. The gaseous hydrogen fluoride gas stream is condensed at a temperature of 59° F. The substantially anhydrous liquid hydrogen fluoride product represents a recovery of 82% of the fluorine values in the incoming fluosilicic acid as HF.

EXAMPLE II

An aqueous ammonium fluoride solution prepared from fluosilicic acid and ammonium hydroxide as described in Example I is introduced into a heating zone or stripper-evaporator zone wherein the ammonium fluoride solution is heated at a temperature of 320° F. During the heating water is evaporated and the ammonium fluoride is converted into ammonium bifluoride and ammonia with the ammonia gas passing out with the water vapor. The ammonia is recovered and recycled into contact with fresh incoming fluosilicic acid.

The ammonium bifluoride is removed from the heating zone and is quenched with water to produce an aqueous solution of ammonium bifluoride. The aqueous solution of ammonium bifluoride and —100 mesh sodium fluoride are introduced into a reactor-cooler in which they are admixed and reacted at a temperature maintained at 122° F. For each 423 parts by weight of fluorine in the ammonium bifluoride material, 232 parts by weight of sodium as sodium fluoride is introduced into the reactor. 2 parts by weight of Na represents make-up material with the rest being recycle. The reaction product is a slurry containing crystals of sodium bifluoride. The slurry is centrifuged and the mother liquor containing ammonium fluoride is recycled to the stripper-evaporator for conversion into more ammonium bifluoride. The moist crystals of sodium bifluoride are dried at a temperature of 266° F. during which drying more ammonium fluoride and ammonia is driven off and recycled to the stripper-evaporator.

The dried crystals of sodium bifluoride, which are substantially free of ammonia and ammonium fluoride, are then subjected to calcination at a temperature of 617° F. during which the sodium bifluoride decomposes into sodium fluoride solid and gaseous hydrogen fluoride. The sodium fluoride is separated from the gas and is recycled into contact with more ammonium bifluoride.

The gaseous hydrogen fluoride-containing gas stream is condensed at a temperature of 59° F. The product is substantially anhydrous liquid hydrogen fluoride. This product represents an 82% recovery of the fluorine in the fluosilicic acid as hydrogen fluoride.

EXAMPLE III

A solution of $NH_4F$ was prepared by adding slowly 183.4 g. of $NH_4OH$ (28.9% $NH_3$) to 300 g. of 23% fluosilicic acid while stirring in a cold water bath. Silica precipitated and the precipitated silica was separated by filtration and washed. One gram of the filtrate contained approximately 0.3 g. of $NH_4F$.

To 25 g. of the above $NH_4F$ solution was added 19.1 g. of $KF \cdot 2H_2O$ according to the reaction:

$$NH_4F + KF \cdot 2H_2O \rightarrow KF \cdot HF + NH_3 + 2H_2O$$

The solution became cold and $NH_3$ was evolved. The solution was evaporated at 110° C. to dryness. 15.2 g. of crystals were obtained. X-ray diffraction analysis of the crystals showed that $KF \cdot HF$ was the major component.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

We claim:

1. A process for preparing hydrogen fluoride from fluosilicic acid which comprises the following steps:
   (a) reacting fluosilicic acid with ammonia to form ammonium fluoride and silica,
   (b) separating said silica from said ammonium fluoride,
   (c) introducing said separated ammonium fluoride and an alkali metal fluoride into a treating zone wherein said ammonium fluoride and said alkali metal fluoride are subjected to treating conditions to react a fluoride of ammonia with said alkali metal fluoride to form an alkali metal bifluoride,
   (d) separating said alkali metal bifluoride from the mixture resulting from step (c),
   (e) heating said separated alkali metal bifluoride to a temperature at least sufficiently high to produce an alkali metal bifluoride substantially free of ammonia and ammonium fluoride and below that at which substantial decomposition of said alkali metal bifluoride is effected,
   (f) heating the alkali metal bifluoride substantially free of ammonia and ammonium fluoride from step (e) to a temperature sufficiently high to decompose said alkali metal bifluoride to form hydrogen fluoride and alkali metal fluoride,
   (g) separating said alkali metal fluoride and said hydrogen fluoride produced by the heating in step (f),
   (h) recycling said alkali metal fluoride separated in step (g) to step (c), and
   (i) recovering said hydrogen fluoride separated in step (g).

2. The process of claim 1 wherein said alkali metal is potassium.

3. The method of claim 1 wherein said fluoride of ammonia comprises ammonium bifluoride and said alkali metal is sodium.

4. A process for preparing hydrogen fluoride from fluosilicic acid which comprises the following steps:
   (a) reacting fluosilicic acid with ammonia to form an aqueous solution of ammonium fluoride and silica,
   (b) separating said silica from said aqueous solution of ammonium fluoride,
   (c) introducing said separated aqueous solution of ammonium fluoride and an alkali metal fluoride into a treating zone wherein said ammonium fluoride and said alkali metal fluoride are subjected to treating conditions including temperatures within the range of from about 50° F. to about 410° F. to react a fluoride of ammonia with said alkali metal fluoride to form an alkali metal bifluoride from substantially all of said alkali metal fluoride,
   (d) separating said alkali metal bifluoride from the mixture resulting from step (c),
   (e) heating said separated alkali metal bifluoride to a temperature at least sufficiently high to produce an alkali metal bifluoride substantially free of ammonia and ammonium fluoride and below that at which substantial decomposition of said alkali metal bifluoride is effected,
   (f) heating the alkali metal bifluoride substantially free of ammonia and ammonium fluoride from step (e) to a temperature above about 575° F. to decompose said alkali metal bifluoride to form hydrogen fluoride and alkali metal fluoride,
   (g) separating said alkali metal fluoride and said hydrogen fluoride produced by the heating in step (f),
   (h) recycling said alkali metal fluoride separated in step (g) to step (c), and
   (i) recovering said hydrogen fluoride separated in step (g).

5. A process for preparing hydrogen fluoride from fluosilicic acid which comprises the following steps:
   (a) reacting fluosilicic acid with ammonia to form ammonium fluoride and silica,
   (b) separating said silica from said ammonium fluoride,
   (c) introducing said separated ammonium fluoride and sodium fluoride into a treating zone, heating said ammonium fluoride in said treating zone to a temperature within the range of from about 250° F. to about 410° F. thereby converting said ammonium fluoride to ammonium bifluoride and ammonia, reacting said ammonium bifluoride with said sodium fluoride in aqueous solution in said treating zone at a temperature within the range of from about 50° F. to about 170° F. to form solid sodium bifluoride,
   (d) separating said sodium bifluoride from the mixture resulting from step (c),
   (e) heating said separated sodium bifluoride to a temperature within the range of from about 212° F. to about 550° F. to produce dry sodium bifluoride substantially free of ammonia and ammonium fluoride,
   (f) heating said sodium fluoride substantially free of ammonia and ammonium fluoride from step (e) to a temperature above about 575° F. to decompose said sodium bifluoride to form hydrogen fluoride and sodium fluoride,
   (g) separating said sodium fluoride and said hydrogen fluoride produced by the heating in step (f),
   (h) recycling said sodium fluoride separated in step (g) to step (c), and
   (i) recovering said hydrogen fluoride separated in step (g).

6. A process for preparing hydrogen fluoride from fluosilicic acid which comprises the following steps:
   (a) reacting fluosilicic acid with ammonia to form ammonium fluoride and silica,
   (b) separating said silica from said ammonium fluoride,
   (c) introducing said separated ammonium fluoride and sodium fluoride into a treating zone, heating said ammonium fluoride in said treating zone to a temperature within the range of from about 300° F. to about 400° F. thereby converting said ammonium fluoride to ammonium bifluoride and ammonia, reacting said ammonium bifluoride with said sodium fluoride in aqueous solution in said treating zone at a temperature within the range of from about 90° F. to about 150° F. to form solid sodium bifluoride,
   (d) separating said sodium bifluoride from the mixture resulting from step (c),
   (e) heating said separated sodium bifluoride to a temperature within the range of from about 225° F. to about 300° F. to produce dry sodium bifluoride substantially free of ammonia and ammonium fluoride,
   (f) heating said sodium fluoride substantially free of ammonia and ammonium fluoride from step (e) to a temperature within the range of from about 575° F. to about 650° F. to decompose said sodium bifluoride to form hydrogen fluoride and sodium fluoride,
(g) separating said sodium fluoride and said hydrogen fluoride produced by the heating in step (f),
(h) recycling said sodium fluoride separated in step (g) to step (c), and
(i) recovering said hydrogen fluoride separated in step (g).

7. A process for preparing hydrogen fluoride from fluosilicic acid which comprises the following steps:
(a) reacting fluosilicic acid with ammonia to form ammonium fluoride and silica,
(b) separating said silica from said ammonium fluoride,
(c) introducing said separated ammonium fluoride and potassium fluoride into a treating zone wherein said ammonium fluoride and said potassium fluoride are reacted at a temperature within the range of from about 220° F. to about 270° F. to form potassium bifluoride and ammonia,
(d) separating said potassium bifluoride from the mixture resulting from step (c),
(e) heating said separated alkali metal bifluoride at a temperature within the range of from about 240° F. to about 300° F. to produce potassium bifluoride substantially free of ammonia and ammonium fluoride,
(f) heating the potassium bifluoride substantially free of ammonia and ammonium fluoride from step (e) to a temperature within the range of from about 625° F. to about 700° F. to decompose said potassium bifluoride to form hydrogen fluoride and potassium fluoride,
(g) separating said potassium fluoride and said hydrogen fluoride produced by the heating in step (f),
(h) recycling said potassium fluoride separated in step (g) to step (c), and
(i) recovering said hydrogen fluoride separated in step (g).

8. A process for preparing hydrogen fluoride from fluosilicic acid which comprises the following steps:
(a) reacting fluosilicic acid with ammonia recycled from step (c) to form ammonium fluoride and silica,
(b) separating said silica from said ammonium fluoride,
(c) introducing said separated ammonium fluoride into a treating zone, heating said ammonium fluoride and recycle ammonium fluoride from steps (d) and (e) in said treating zone to a temperature within the range of about 250° F. to about 410° F. thereby converting the ammonium fluoride to ammonium bifluoride and ammonia, recycling said ammonia to step (a), introducing sodium fluoride, including the sodium fluoride recycle of step (h) into said treating zone, reacting said ammonium bifluoride with said sodium fluoride in aqueous solution in said treating zone at a temperature within the range of from about 50° F. to about 170° F. to form solid sodium bifluoride and ammonium fluoride,
(d) separating said sodium bifluoride containing some ammonium fluoride from the mixture resulting from step (c) which contains the major portion of the ammonium fluoride and recycling the ammonium fluoride to step (c),
(e) heating said separated sodium bifluoride to a temperature within the range of from about 212° F. to about 550° F. to produce gaseous ammonium fluoride and dry sodium bifluoride substantially free of ammonia and ammonium fluoride, and recycling the ammonium fluoride to step (c),
(f) heating said sodium fluoride substantially free of ammonia and ammonium fluoride from step (e) to a temperature above about 575° F. to decompose said sodium bifluoride to form hydrogen fluoride and sodium fluoride,
(g) separating said sodium fluoride and said hydrogen fluoride produced by the heating in step (f),
(h) recycling said sodium fluoride separated in step (g) to step (c), and
(i) recovering said hydrogen fluoride separated in step (g).

9. A process for preparing hydrogen fluoride from fluosilicic acid which comprises the following steps:
(a) reacting fluosilicic acid with ammonia recycled from steps (d) and (e) to form ammonium fluoride and silica,
(b) separating said silica from said ammonium fluoride,
(c) introducing said separated ammonium fluoride and potassium fluoride, including the potassium fluoride recycle of step (h), into a treating zone wherein said ammonium fluoride and said potassium fluoride are reacted at a temperature within the range of from about 200° F. to about 410° F. to form potassium bifluoride and ammonia,
(d) separating said potassium bifluoride containing some ammonia from the mixture resulting from step (c) which contains the major portion of the ammonia and recycling said ammonia to step (a),
(e) heating said separated alkali metal bifluoride at a temperature within the range of from about 200° F. to about 550° F. to produce gaseous ammonia potassium bifluoride substantially free of ammonia and ammonium fluoride and recycling the ammonia to step (a),
(f) heating the potassium bifluoride substantially free of ammonia and ammonium fluoride from step (e) to a temperature above about 600° F. to decompose said potassium bifluoride to form hydrogen fluoride and potassium fluoride,
(g) separating said potassium fluoride and said hydrogen fluoride produced by the heating in step (f),
(h) recycling said potassium fluoride separated in step (g) to step (c), and
(i) recovering said hydrogen fluoride separated in step (g).

10. A process for the production of hydrogen fluoride from fluosilicic acid which comprises the following steps: reacting ammonia with an aqueous solution of fluosilicic acid to form ammonium fluoride and silica, separating said silica from said ammonium fluoride, reacting said ammonium fluoride with potassium fluoride in aqueous solution to form potassium bifluoride and ammonia, heating the resultant solution to drive said ammonia out of the solution and recycling said ammonia and separating said potassium bifluoride from the solution, heating said separated potassium bifluoride to form potassium fluoride and hydrogen fluoride, and recycling said potassium fluoride.

References Cited by the Examiner

UNITED STATES PATENTS 2,865,709 12/58 Horn et al. _____ 23—88
2,880,060 3/59 Campbell _____ 23—88 X

FOREIGN PATENTS 1,010,504 6/57 Germany.

MAURICE A. BRINDISI, *Primary Examiner.*